United States Patent [19]

Stevens

[11] 3,888,974
[45] June 10, 1975

[54] PROCESS FOR HYDROGEN ISOTOPE EXCHANGE AND CONCENTRATION BETWEEN LIQUID WATER AND HYDROGEN GAS AND CATALYST ASSEMBLY THEREFOR

[75] Inventor: William H. Stevens, Deep River, Ontario, Canada

[73] Assignee: Atomic Energy of Canada Limited, Ottawa, Ontario, Canada

[22] Filed: July 13, 1973

[21] Appl. No.: 379,164

[30] Foreign Application Priority Data
Jan. 28, 1970  Canada .................................. 73320

[52] U.S. Cl. ................ 423/580; 252/430; 252/459; 252/460; 423/648
[51] Int. Cl. ....... C01b 5/00; B01j 9/04; B01j 11/08
[58] Field of Search ............... 252/430, 460, 459; 423/580, 648, 651, 653

[56] References Cited
UNITED STATES PATENTS

| | | | |
|---|---|---|---|
| 3,681,021 | 8/1972 | Mikovsky et al. .................. | 423/580 |
| 3,681,257 | 8/1972 | Levy ................................... | 252/430 |
| 3,695,841 | 10/1972 | Zirker et al. ....................... | 423/651 |
| 3,711,598 | 1/1973 | Babcock ............................ | 423/580 |
| 3,789,112 | 1/1974 | Pachaly ............................. | 423/580 |

*Primary Examiner*—John H. Mack
*Assistant Examiner*—Donald R. Valentine
*Attorney, Agent, or Firm*—James R. Hughes; Francis W. Lemon

[57] ABSTRACT

A bithermal, catalytic, hydrogen isotope exchange process between liquid water and hydrogen gas to effect concentration of the deuterium isotope of hydrogen, wherein liquid water and hydrogen gas are contacted with one another and with at least one catalytically active metal selected from Group VIII of the Periodic Table, the catalyst body has a water repellent, gas and water vapour permeable, organic polymer or resin coating, preferably a fluorinated olefin polymer or silicone resin coating, so that the isotope exchange takes place by two simultaneously occurring, and closely coupled in space, steps namely, using protium (H) and deuterium (D) as the example,

HD gas + H$_2$O vapour $\underset{\text{catalyst}}{\rightleftharpoons}$ H$_2$ gas + HDO vapour and HDO vapour + H$_2$O liquid $\underset{\text{surface}}{\overset{\text{liquid water}}{\rightleftharpoons}}$ HDO liquid + H$_2$O vapour and concentration is effected by operating two interconnected sections containing catalyst at different temperatures.

15 Claims, 6 Drawing Figures

PROCESS FOR HYDROGEN ISOTOPE EXCHANGE AND CONCENTRATION BETWEEN LIQUID WATER AND HYDROGEN GAS AND CATALYST ASSEMBLY THEREFOR

This invention relates to a process for hydrogen isotope exchange and concentration between liquid water and hydrogen gas, and a catalyst assembly therefor.

More particularly, the present invention relates to a process for increasing the concentration of at least one of a plurality of hydrogen isotopes, namely protium (symbol H), deuterium (symbol D), or tritium (symbol I) in either liquid water or gaseous hydrogen, by donation from either the liquid water or gaseous hydrogen. The expression "donation from either the liquid water or gaseous hydrogen" is used because, as will be explained later, a unique feature of the present invention is that the actual hydrogen isotope exchange does not occur directly between the water in liquid form and the gaseous hydrogen even though liquid water and geseous hydrogen are brought together in the presence of a catalyst assembly.

Important present day uses for processes for hydrogen isotope concentration in liquid water or gaseous hydrogen are related particularly to the field of nuclear energy and include, for example:
1. The production of heavy water, that is to say water highly enriched in the deuterium isotope, for use as a moderator in a nuclear reactor, and
2. The reconcentration of the deuterium oxide in heavy water that has become downgraded, that is to say diluted with ordinary water to a lower deuterium content during use in, for example, a nuclear reactor.

A potential use for processes to change hydrogen isotope ratios in liquid water and gaseous hydrogen is to reduce the tritium concentration, present for example as DTO, in heavy water that has been used in an operating nuclear reactor for some time as a moderator and/or coolant. Such a reduction of the tritium concentration, produced by the reaction of a neutron with the nucleus of a deuterium atom, is desirable because tritium is radioactive, and tritiated water can be incorporated into the body water of nuclear reactor maintenance workers by inhalation, ingestion, or transpiration through the skin.

A further potential use of processes for hydrogen isotope concentration in liquid water and gaseous hydrogen, which could become important in the future, is for the concentration of deuterium and tritium to supply fuel for one or more of the energy producing nuclear processes commonly known as "controlled nuclear fusion," and which are presently being developed in the major industrial nations.

The deuterium isotope of hydrogen, which has an approximate atomic weight of two compared with one for protium, is normally present in hydrogen gas, water or any chemical compound containing hydrogen, in only very low concentrations. The percentage natural abundance of deuterium in hydrogen is given as 0.0150 percent in the well known "Handbook of Chemistry and Physics," 49th edition (1968-69), published by the Chemical Rubber Company, Cleveland, Ohio. The deuterium content present in natural, untreated water is usually within the range of 0.012 to 0.016 percent (one hundred and twenty to one hundred and sixty parts per million) depending on the source of the untreated water. In polar regions the deuterium concentration has even been found to be below one hundred parts per million. Thus to produce heavy water, that is liquid water that is highly enriched with deuterium, at a rate of say one hundred tons per year from untreated feed water requires the processing of well over one thousand gallons of the untreated feed water per minute, and for a process to do this economically the process must be very efficient.

It is an object of the present invention to provide a process for hydrogen isotope exchange and concentration between liquid water and hydrogen gas, and a catalyst assembly therefor, which is economically more efficient than known processes.

The search for an economical process to produce deuterium enriched liquid water, that is heavy water, in the United States of America began in the early days of the Manhattan Project in 1941. A record of the work done under the Manhattan Project to develop such a process is contained in "Production of Heavy Water," Vol. 4F of Division III of the National Nuclear Energy Services, Manhattan Project Technical Section, McGraw Hill (1955). Since then it has been found that the concentration of the isotope in hydrogen gas, water, and many other compounds containing hydrogen can be changed quite readily by a number of physical and chemical processes. For example, F. T. Barr and W. P. Drew, as recorded in Chemical Engineering Progress, Vol. 56, No. 3, pages 40–56, 1960, surveyed ninety-eight processes, not including such established methods as water distillation; hydrogen distillation; dual-temperature exchange between water and hydrogen sulfide; conventional electrolysis of water; hydrogen/ammonia high pressure, dual-temperature exchange; and single temperature hydrogen-water vapour catalytic exchange, with electrolytic regeneration of enriched hydrogen, commonly known as the Trail Process. Eight promising methods for producing heavy water, from the ninety-eight processes, are discussed in more detail, with an economic assessment, in the above mentioned article by F. T. Barr and W. P. Drew. Four of the eight processes thought to be promising are chemical exchange processes, one being for the catalytic exchange of hydrogen isotopes between hydrogen gas and liquid water, but a suitable catalyst to make this process economically viable was not available prior to the present invention being conceived.

More recently, a report was prepared for the United States Heavy Water Reactor Based Program by J. A. Ayres entitled "Production of Heavy Water - Status Report," Batelle Memorial Institute, Pacific Northwest Laboratory, Richland, Wash., 99353, Report No. BNWL-884 UC-80, Reactor Technology, March 1969. It is instructive for an understanding of the advance contributed to the art by the present invention to quote from page 152 of Ayres' report:

"$H_2O$-HD. The $H_2O$-HD exchange is a process of very high potential, but at present it is not competitive because no suitable catalyst has been developed. The catalyst must be relatively inexpensive to use, not corrosive, and must effect a rapid reaction rate. An expensive catalyst could be used if it could be economically recovered or if it were present as a stable bed and not removed by the liquid or gas."

It is a further object of the present invention to provide a process for hydrogen isotope exchange and concentration between liquid water and hydrogen gas, and a catalyst assembly therefor, which do not suffer to the same extent the problems associated with the known catalytic exchange process of hydrogen isotopes between liquid water and hydrogen gas.

In a hydrogen isotope exchange process between two substances, each of which contains hydrogen and is capable of containing more or less of the desired hydrogen isotope, the concentration of the desired hydrogen isotope in each substance under conditions of substantial chemical equilibrium are determined by nature and are normally expressed by what is known as an "equilibrium constant." For the hydrogen/water isotope exchange involving protium (H) and deuterium (D), the isotope exchange reaction may be expressed as:

$$H_2O + HD \rightleftharpoons HDO + H_2 \quad (1)$$

The equilibrium exchange constant K for this isotope exchange reaction is then expressed as:

$$K = \frac{(HDO) \times (H_2)}{(H_2O) \times (HD)} \quad (2)$$

where the parenthesis indicate concentration in some suitable units such as pound moles per cubic foot, the units cancelling in this case so that K is dimensionless. The numerical value of K changes with temperature and also differs slightly depending on whether the isotopic exchange is ocurring between liquid water and hydrogen gas or between water vapour and hydrogen gas. The following values for K at several temperatures are from data quoted in the above mentioned Ayres report:

TABLE 1

| TEMPERATURE (°C) | $K_L$ (LIQUID WATER) | $K_V$ (WATER VAPOUR) |
|---|---|---|
| 0 | 4.70 | 4.19 |
| 100 | 2.74 | 2.65 |
| 250 | 1.80 | 1.83 |
| 600 | 1.52 | 1.28 |

The mathematical equations that best fit the experimental data for K are:

$$\log K_L = \frac{238}{T(°C)} - 0.200, \quad (3)$$

and $$\log K_V = \frac{188}{T(°C)} - 0.095 \quad (4)$$

From equations (1) and (2), and from the values for K obtained from the Table 1 or equations (3) and (4), it is apparent that the deuterium isotope will always attain a higher concentration in water, with the water either in the liquid or vapour phase, than in hydrogen gas in contact with it, at equilibrium below 600°C. It is also evident that the lower the temperature, the more the deuterium will concentrate in the water. Similar chemical isotope exchange reactions between water and hydrogen gas, and their equilibrium constants, are known for all the combinations of reactions, for all the hydrogen isotopes and a person skilled in the art can calculate the concentrations of any, or all, of the hydrogen isotopes in hydrogen gas and water in contact with each other at chemical equilibrium, at a given temperature.

All of the above information concerning equilibrium concentrations among the hydrogen isotopes is well known to those skilled in the art and can readily be used by them to determine the optimum conditions for the isotopic enrichment of hydrogen gas or water in liquid or vapour phase desired and the appropriate draw-off point for the enriched hydrogen gas or liquid water or water vapour in an isotope enrichment cascade of the type that will be described with reference to the accompanying drawings.

Catalysts that are very effective for bringing about isotope exchange and approach to equilibrium between water vapour and hydrogen gas are well known and include Group VIII metals, in particular platinum and nickel. However, when such catalysts are used in contact with hydrogen and liquid water, as taught by U.S. Pat. No. 2,690,379, dated Sept. 28, 1954 (H. C. Urey et al.) or U.S. Pat. No. 2,787,526, dated Apr. 2, 1957 (J. S. Spevack), the rate of approach to equilibrium conditions attained is two to three orders of magnitude lower than the rate attained when the catalyst is in contact with hydrogen and water in the vapour phase only. Further, when a catalyst such as platinum or nickel is brought into contact with liquid water the catalyst rapidly becomes poisoned and ceases to function. Thus while Urey et al and Spevack have both taught using a catalyst such as platinum since Apr. 2, 1957, persons skilled in the art have been unable to put this into practice in a feasible manner from an economical point of view. In fact persons skilled in the art have been led, in attempting to practice the teachings of either Urey et al. or Spevack, to the conclusion that a catalyst such as platinum cannot be used in contact with liquid water under any circumstances and be economically acceptable.

In order to design an economical process for hydrogen isotope separation based on isotope exchange between hydrogen and water it is necessary to combine several, consecutive exchange stages or steps, in a manner commonly known as a cascade process, as described, for example, in Nuclear Chemical Engineering, by M. Benedict and T. H. Pigford, McGraw-Hill, 1957. The cascade process requires hydrogen gas and water to flow substantially in opposite directions at least between stages, although not necessarily within each stage, and this can only be accomplished at reasonable cost if the water is in the liquid state at least between stages. The most economical and efficient way to accomplish the opposite flow is to keep the bulk of the water continuously in the liquid state and flow this counter-current to the gaseous hydrogen except for the water vapour that of necessity is contained as humidity in the hydrogen gas in contact with the liquid water. It has been frequently stated in the pertinent literature that this process would be very attractive if the rate of hydrogen isotope exchange between hydrogen gas and liquid water was sufficiently rapid for the process to be economically feasible.

It is an object of the present invention to provide a process for hydrogen isotope concentration between liquid water and hydrogen gas, and a catalyst assembly, wherein the rate of the hydrogen isotope exchange reaction is at a sufficiently rapid rate that the process attains an economic advantage over known hydrogen isotope concentration processes.

The only process so far that has been used successfully to produce several hundred tons of heavy water per year at one installation has been one of the processes disclosed in U.S. Pat. No. 2,787,526 (J. S. Spevack), and it is commonly known as the GS process. The GS process uses hydrogen isotope exchange between hydrogen sulfide and liquid water, as expressed by the reaction:

$$H_2O + HDS \rightleftharpoons HDO + H_2S$$

in a dual temperature counter-current cascade, and is an ionic process and does not require a catalyst.

Given an effective catalyst to bring about sufficiently rapid isotope exchange between hydrogen gas and liquid water, a bithermal process with hydrogen gas and liquid water operated in the same general manner as the GS process would be considerably superior to the GS process because the change in isotope equilibrium constant, with temperature, for the hydrogen/liquid water exchange reaction is more favourable than that for the hydrogen sulfide/water isotope exchange reaction, which leads to a higher efficiency of separation for the bithermal hydrogen/water exchange process than that obtainable with the GS process. Thus for the same heavy water requirement, the bithermal hydrogen/water exchange process requires a lower flow of feed water and smaller exchange towers than those required for the GS process. Hydrogen is also superior to hydrogen sulfide as the second fluid in the process because is is much less toxic and less corrosive to metals than hydrogen sulfide. All of the above advantages would be gained once a catalyst is found for the bithermal hydrogen/water exchange process and which does not poison rapidly and retains a high efficiency of separation for a sufficient period of time to be economically attractive.

It is another object of the present invention to provide a catalyst assembly for the bithermal hydrogen/water exchange process and which does not poison rapidly and retains a high efficiency of separation for a sufficient period of time to be economically attractive.

A problem that exists with the hydrogen gas, water vapour exchange process is that for the cascade process to function it is necessary for the hydrogen gas and water vapour to flow in opposite directions and since both are in gaseous form this is an impractical thing to accomplish.

It is an object of the present invention to provide a process for hydrogen isotope concentration between liquid water and hydrogen gas, and a catalyst assembly therefor, which utilizes the following simultaneously occurring and closely coupled in space, two step exchange process which, until the advent of the present invention, was impossible to put into practice:

Step 1 - - - - HD + H$_2$O vapour $\xrightarrow{catalyst}$ H$_2$ + HDO vapour
Step 2 - - - - HDO vapour $\xrightarrow{liquid\ water}$ HDO liquid + H$_2$O vapour These two steps are achieved, according to the present invention, by providing at least one catalyst assembly having a catalyst selected from the group consisting of at least one Group VIII metal, and a coating substantially preventing the catalyst from being wetted by liquid water while allowing hydrogen gas and water vapour to rapidly contact the catalyst, whereby even though liquid water and hydrogen gas are brought into contact with the, or each, catalyst assembly, the exchange occurs by the above mentioned two steps.

It has already been proposed in the following disclosures to provide a catalyst with a coating. However, none of these proposals would lead a person skilled in the art to practice the present invention for the reasons given:

U.S. Pat. No. 2,976,253, dated Mar. 21, 1961, O. D. Edwards.

A catalyst is provided with a temporary protective coating against catalyst deterioration from moisture and attrition, the coating being substantially moisture, including water vapour, impermeable. The thickness envisaged of 0.5 to 10 mils thick verifies this point.

U.S. Pat. No. 2,540,599, dated Feb. 6, 1951, M. A. Segura.

A catalyst for a hydrocarbon synthesis process wherein feed gases containing carbon monoxide and hydrogen are contacted under synthesis conditions (300°F to 800°F are mentioned) with iron containing catalyst particles, bonded together by an organic thermosetting resinous material, to prevent fragmentation of the catalyst caused by forces accompanying the deposition of carbonaceous material thereon. The bonding together of the iron containing catalyst particles by an organic thermosetting resinous material as taught by Segura would prevent hydrogen gas or water vapour from contacting the catalyst of the present invention at the cold temperature of 25°C at which hydrogen isotope exchange must be able to occur for the process to be operable.

U.S. Pat. No. 2,722,504, dated Nov. 1, 1955, R. N. Fleck.

There is provided a particle-form adsorbent catalytic contacting material stable at temperatures in excess of 500°F comprising (1) a major proportion of activated oxide selected from the group consisting of silica-gel, activated alumina and mixtures thereof, (2) a minor proportion, between about 5 percent and 25 percent by weight, of a catalytic agent selected from the class consisting of the oxides and sulfides of transitional metals having an atomic number between 22 and 42, and (3) and intimately bonded coating of an organophilic silicone, said silicone coating having been formed in situ by adsorbing onto the active surface of said activated oxide a monomeric silicone precursor having the formula:

wherein x is a hydrolyzable group, R$_1$ is a non-hydrolyzable hydrocarbon radical bonded to Si through a carbon atom, and R$_2$ and R$_3$ are selected from the class consisting of hydrolyzable groups and non-hydrolyzable hydrocarbon radicals bonded to Si through a carbon atom, then hydrolyzing the adsorbed siliconeprecursor to form an adsorbent substrate containing intimately bonded silicone in amounts corresponding to between about 0.001 percent and 5 percent by weight of silicon, relative to the final catalyst composition. This catalyst was designed for use at temperatures in excess of about 500°F at which temperatures the silicone would be expected to be permeable to gaseous matter. This catalyst coating could not be used in the presence of water vapour at temperatures in excess of 500°F because the silicone coating would decompose at these temperatures in the presence of the water vapour. Thus Fleck's teachings would tend to lead a person skilled in the art to believe that, in practicing Fleck's invention, such silicone coatings could not be used in the presence of water vapour.

Furthermore since none of the above patents, in combination with any prior art, teach the intimate, simultaneous two step exchange process according to the present invention, then it is apparent that the present invention represents a novel and unforseen contribution to the art.

According to the present invention there is provided a process for hydrogen isotope exchange and concentration between liquid water and hydrogen gas, comprising:

a. contacting at a temperature in the range 15°C to 70°C, in a first section, liquid water and, the hydrogen gas from a second section, with one another and with a catalyst consisting of at least one catalytically active metal selected from Group VIII of the Periodic Table so that the hydrogen isotope, deuterium, is exchanged into and concentrated in the liquid water passing through and leaving the first section from the hydrogen gas passing through and leaving the first section, in either counter-current or cocurrent flow, b. contacting at a temperature in the range 150°C to 200°C in a second section, pressurized to keep water liquefied, the liquid water from the first section and the hydrogen gas, passing to the first section, with one another and with a catalyst consisting of at least one catalytically active metal selected from Group VIII of the Periodic Table so that the hydrogen isotope, deuterium, is extracted into and concentrated in the hydrogen leaving the second section from the liquid water passing through the second section, and c. withdrawing from between the first and second sections, a portion of the liquid water having the hydrogen isotope, deuterium, concentrated therein or the hydrogen gas having the hydrogen isotope, deuterium, concentrated therein, and wherein the improvement comprises:

d. the catalyst is provided in the first and second sections as at least one catalyst assembly and comprises the catalyst and a substantially liquid-water-repellent organic resin or polymer coating thereon, but which is permeable to water vapour and hydrogen gas, whereby:

e. each catalyst assembly causes hydrogen isotope exchange and concentration to occur as follows:

and vapour so that direct contact between the catalyst and liquid water and wetting of the catalyst is retarded by the organic polymer or resin coating, thereby retarding poisoning of the catalyst by the liquid water.

In one practical embodiment of the present invention the hydrogen from the first section is recirculated through the second section to the first section, and a portion of the liquid water having the hydrogen isotope concentrated therein from feed water is withdrawn from between the first and second sections. oxide, Preferably each catalyst assembly comprises a catalyst support, the catalyst and the substantially water repellent organic polymer or resin coating thereon, and the catalyst support consists of at least one material selected from the group carbon, graphite, charcoal, alumina, magnesia, silica, silica gel, chromia, molybdenum oxide, tungstic oxide, nickel oxide,, kieselguhr and metal substrate.

Preferably for each catalyst assembly the total amount of catalyst is not greater than 5 percent by weight of the total weight of that catalyst assembly, and the total amount of the substantially waterproof and water repellent organic resin or polymer coating is not greater than 10 percent by weight of the total weight of that catalyst assembly.

More particularly for each catalyst assembly the total amount of catalyst is perferably not greater than 0.5 to 1.0 percent by weight of the total weight of that catalyst assembly, and the catalyst is dispersed in an outer layer of the support.

The coating may be of polytetrafluoroethylene having a fibrous network or mesh structure, and the polytetrafluoroethylene may be applied to the catalyst as a colloidal suspension, the dispersing liquid evaporated, and the particles sintered to form the fibrous network or mesh structure.

In different embodiments of the present invention the coating may be a silicone, for example a polysiloxane such as polyalkylsiloxane having substituent groups selected from hydroxyl, methoxyl and ethoxyl. Furthermore the coating may comprise a polydimethylsiloxane having a minor amount of substituent groups selected from hydroxyl, methoxyl and ethoxyl and include at least one substituent selected from ethyl, propyl, isopropyl and t-butyl groups.

When the coating is a silicone the coating is preferably about 1 to 10 percent by weight of the catalyst assembly, more specifically 2 to 5 percent by weight of the catalyst assembly, and the coating is preferably from about $10^{-3}$ to $10^{-1}$ microns average thickness.

Preferably the support is selected from carbon, graphite, charcoal, alumina, silica, silica gel, chromia and nickel oxide and the catalytically active metal is selected from Pt, Rh, Pd and Ni.

A catalyst support is not essential. The catalytically active metal or metals from Group VIII of the Periodic Table can be used alone in any appropriate configuration, or may be supported on another metal, which may for instance be in the form of a wire mesh article. However, economics usually require a suitable high surface area support for the catalytically active metal or metals.

In the accompanying drawings which illustrate, by way of example, embodiments of the present invention.

Figure 1:
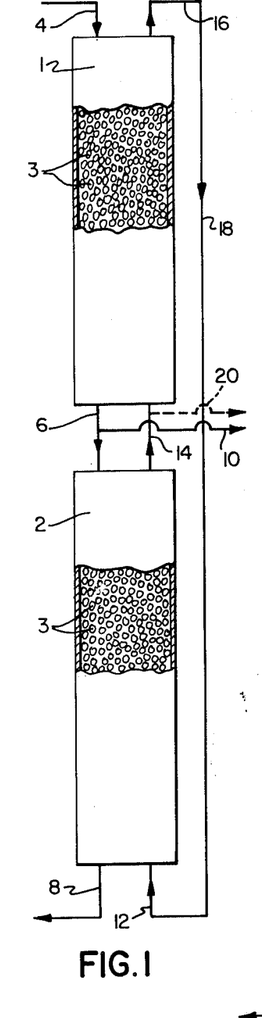
FIG. 1 is a diagrammatic side view, with parts cut away, of apparatus for a first stage, consisting of a first and a second section for deuterium exchange and concentration between liquid water and hydrogen gas.

In FIG. 1 there is shown a first stage tower, consisting of a first section 1 and a second section 2. The sections 1 and 2 are each filled with catalyst assemblies 3. The first section 1 has a liquid water inlet 4 and a liquid water outlet 6 to the second section 2. The second section 2 has a liquid water outlet 8 (to waste). A withdrawal pipe 10 is connected to the outlet 6 for withdrawing liquid water therefrom between the sections 1 and 2.

The second section 2 has a hydrogen gas inlet 12 and a hydrogen gas outlet 14 heading to the first section 1. The first section has a hydrogen gas outlet 16 connected to the hydrogen gas inlet 12 by pipe 18.

The catalyst assemblies 3 may conveniently be supported in the sections 1 and 2 on metal sieve tray supports, for example.

Each catalyst assembly 3 consists of:
a. at least one catalytically active metal from Group VIII of the Periodic Table, such as platinum or rhodium or nickel, for example in the form of very small crystallites having a diameter typically in the thirty to two hundred Angstrom range,
b. a highly porous, solid support such as carbon, graphite, charcoal, alumina, silica gel, and the like, with the catalytically active metal deposited on the surface of the pore walls thereof. The support may typically be in the form of granules, pellets, spheres, rings, Berl saddles and the like, which are commonly used, and
c. a substantially water repellent organic polymer or resin coating such as a polyfluorocarbon or silicone deposited on the support, and within and upon pore surfaces of the support, the coating rendering the catalyst body substantially impermeable to liquid water, but permeable to water vapour and hydrogen gas. In other words the coating substantially prevents bulk liquid water from entering the pores of the porous support, wherein the catalytic material is located, but the entry of water vapour molecules and hydrogen gas molecules and access to the catalytic material by these gaseous molecules is essentially unimpeded.

When using a porous support, preferably the polyfluorocarbon or silicone does not completely enclose the entire outer surface of the porous support because this would substantially impede free access of water vapour and hydrogen gas into and out of the porous structure of the support and thus impede access to and from the surface of the catalytically active metal crystallites. Examples of how a substantially water repellent coating may be applied will be given. It should be apparent, however, that the object of the provision of the water repellent coating for the catalyst assemblies 3 is to prevent bulk liquid water from wetting the outer surfaces of the support, entering the pores of the support, and completely covering the catalyst support surfaces and thus poisoning the catalytically active metal while nevertheless allowing water vapour molecules and hydrogen gas molecules to surround the catalyst body and have free access to and from the interior of the porous support and thus access to and from the catalytically active metal crystallites deposited upon the pore walls within the support. Catalyst preparations consisting of the catalytically active metal and support are commercially available from several manufactures of industrial catalysts. Substantially waterproof and water repellent coating materials desirable for deposition on said catalysts are readily available from several manufacturers of silicone products and fluorinated hydrocarbons. The scope of the invention is not to be construed to be limited to these particular water repellent materials, but these have been found very suitable.

A commercially available catalytically active metaland-support combination suitable as starting material for the catalyst assemblies consists of bodies each comprising 0.5 percent by weight, of the total weight of the body, of platinum as the catalytically active metal on alumina ($Al_2O_3$) bodies forming the catalyst support. The bodies may be one-fourth inch balls or one-half inch saddles, for example. Other examples of acceptable catalytically active metal-and-support combinations are described below. The water repellent coating may be formed of any hydrophobic resin or polymer, applied in an appropriate manner, which is permeable to the hydrogen and water vapour, such as polytetrafluoroethylene, polyethylene, polypropylene, siloxane, silicone or other like hydrophobic organic polymer of medium to high molecular weight.

The coating may, for example, be a thin silicone layer, preferably having an average thickness within the range 1–100 (more particularly 3–10) molecular layers. As described above, the coating covers, to a considerable extent, the catalyst support surface, and may be applied by dipping the catalyst bodies in, or spraying them with a solution of a silicone resin e.g. in a petroleum hydrocarbon solvent such as white spirit or Stoddard solvent. The solvent is then evaporated to form a water vapour/hydrogen gas permeable, water repellent silicone coating which substantially covers the catalyst support. Preferably the catalyst asemblies thus produced are given an ageing period for example, of at least about 48 hours, before being used.

The coating may be deposited from a solution (suitably containing about 1 to 10 percent, and preferably 1 to 5 percent, by weight of silicone polymer), to deposit a coating of a thickness of about $10^{-3}$ to $10^{-1}$ microns average thickness, or from about 1 to 30 percent (preferably 5 to 15 percent) by weight polymer based on catalyst body (support plus catalytic metal) depending markedly on the surface area of the support material used.

Dow Corning 773 (Registered Trade Mark) Water Repellent obtainable from Dow Corning Corporation, as a resin concentrate containing 33 percent by weight silicone solids has been found to be a suitable coating material. This coating material is preferably applied to a porous support with the catalyst deposited thereon when it is diluted in a mineral spirit or hexane carrier to about 5 percent by weight of the carrier, and the carrier then evaporated. This catalyst is preferably aged for example about 48 hours in air before use, and preferably at 150°C to 200°C.

A very thin, porous polytetrafluoroethylene film has been found to be suitable as the coating for some types of porous supports having the catalyst deposited thereon and these have been found to be quite efficient in promoting the exchange of deuterium between hydrogen gas and liquid water.

As stated, polytetrafluoroethylene may be applied to a porous support that already has the catalytic material deposited thereon. Preferably the porous supports with the catalyst deposited thereon are treated with a colloidal suspension of polytetrafluoroethylene polymer particles in an aqueous solution of a wetting agent. One such colloidal suspension is DuPont TFE - Fluorocarbon Resin Dispersion, Type 30 obtainable from Du- Pont, U.S.A. Other colloidal suspensions such as DuPont 955-100 Line, One-Coat, Non-Stick Finishes, obtainable from DuPont, U.S.A. may also be used.

The suspensions are diluted, more or less, with a dispersing phase, for example water or an organic solvent, depending on the catalyst support used, and are then applied to the porous support with the catalytic material thereon before coagulation of the polytetrafluoroethylene occurs. The dispersing phase is then allowed to evaporate, or is removed in some other conventional manner. The polytetrafluoroethylene particles which have been deposited on the surfaces of the porous support and catalytic material are then sintered together by heating, for example, in air at 350° to 360°C for 10 minutes to an hour.

It should be noted it is not an objective to form a complete or coherent film over the entire porous support and catalyst surfaces, and that the polytetrafluoroethylene coating produced has more of a fibrous network or mesh structure than a continuous, coherent film structure, and thus has considerable microporosity. For a porous support the objective of the coating is, as already stated, to exclude liquid water from the internal pores of the support wherein is located catalytically active metal, but allow essentially free entry by water vapour and hydrogen gas molecules.

Scanning electron microscope photographs (SEM) have confirmed that the coatings of the improved catalysts of the invention with a polytetrafluoroethylene polymer coating have this fibrous or mesh structure.

The conventional use for these colloidal suspensions is to provide a non-stick or non-wet surface, and for these uses the aim is for the polytetrafluoroethylene coating to have as little porosity as possible.

Proper development of the polytetrafluoroethylene coating on the support with the catalyst deposited thereon depends on having the correct amount of polytetrafluoroethylene particles deposited thereon prior to sintering. The correct amount of polytetrafluoroethylene particles deposited on the support with the catalyst thereon is dependent upon the dilution of the polytetrafluoroethylene suspension and the volume of the suspension taken up by the catalyst when the suspension is applied to it. Dilutions of the commercial polytetrafluoroethylene dispersions of the order of from ten to more than one hundred fold may be required, depending on the porosity of the catalyst support. Porosity throughout the catalyst support is not essential, however.

Other fluorinated olefin polymers can be used to form the coating.

With perfluorinated ethylene-propylene copolymers (FEP-type Telfon) a lower sintering temperature than for polyetetrafluoroethylene should be used to avoid forming an impervious layer.

Polymers of chlorotrifluoroethylene could also be used to form the coatings.

As in the previous embodiments, when using a polytetrafluoroethylene waterproof coating, the catalyst material is a Group VIII metal, and is preferably Pt, Rh, Ir, Pd, or Ni deposited on the catalyst support.

In another embodiment, Pt on a high surface area carbon black powder support, available from several commercial catalyst manufacturers, is slurried with a fluid suspension of colloidal polytetrafluoroethylene particles and the resulting suspension is then applied to a porous ceramic body in a manner similar to that described above for application of a polytetrafluoroethylene coating. In this case, the polytetrafluoroethylene serves not only to wetproof the catalyst body but also to hold the Pt/carbon catalyst particles in place upon a larger inert support.

Non-porous ceramic catalyst supports, roughened by treatment e.g. for several hours with 20 percent by weight sodium hydroxide solution at 60°C, or by treatment with hydrofluoric acid-fluoride etching media have also been used successfully as catalyst supports for platinized and polytetrafluoroethylene coated catalyst according to the invention. However, tests have indicated that higher catalyst activity is usually obtained using a porous support.

The size of the catalyst assemblies according to the invention, having a water repellent coating, is chosen to suit the size of the column used according to conventional, good chemical engineering practice. The shape of the catalyst assemblies according to the invention including a polytetrafluoroethylene coating, may be any of the several conventional shapes known to chemical engineers, such as for example balls, those known as Intalox (trademark - Norton Co.) saddles, Berl saddles, Rashig rings, and Lessing rings, or any other efficient shape for tower packing and designed for counter-current or co-current flow with a gas and a liquid.

The criterion for selecting a particular catalyst material and a particular waterproof coating and a particular catalyst body shape is to achieve a high stage efficiency for the process while at the same time using a small bed of catalyst assemblies.

The following summarises what materials are preferred at present for the various parts of the catalyst assemblies according to the present invention:

CATALYTIC MATERIALS
Group VIII metals; in particular Pt, Ir, Rh, Pd and Ni.
CATALYST SUPPORT
Carbon, graphite, charcoal, alumina ($Al_2O_3$), magnesia, silica ($SiO_2$), silica gel, chromia ($Cr_2O_3$), nickel oxide (NiO) in the usual porous forms such as granular, pellet, right cylinder, spherical, or extruded shapes;
WATER REPELLENT COATING
Polytetrafluoroethylene is a preferred water repellent coating, particularly for the high temperature second section 2. Other waterproof coatings are for example, silicone resins consisting of semipolymerized methyl siloxanes with some percentage of silanol, methoxy or ethoxy, groups attached to the siloxane structure. Usually, a polyalkylsiloxane (e.g. polydimethylsiloxane) is preferred, substituted with sufficient hydroxyl (silanol), methoxy/or ethoxy/groups on the siloxane for postapplication crosslinking, and chemisorption or chemical bonding to the support with the catalyst thereon, and optionally, with some higher alkyl (ethyl, propyl, isopropyl, t-butyl) groups for improved stability toward hydrolysis.

Referring again to FIG. 1, in operation hydrogen gas is passed upwardly by pipe 12 into hot section 2 to flow upwardly around the catalyst assemblies 3 therein, to the outlet 14. From the outlet 14 the hydrogen gas flows upwardly through the cold section 1 around the catalyst assemblies 3 therein, to the outlet 16 from where the hydrogen gas is recirculated to the inlet 12 by pipe 18.

Liquid water is fed to the first section 1 and trickles downwardly over the catalyst assemblies 3 therein to the outlet pipe 6. The outlet pipe 6 passes the liquid water to the second section 2 for it to trickle downwardly over the catalyst assemblies 3 therein and exit by the pipe 8 to waste.

The temperature within the first section is maintained, by means not shown, in the range 15°C to 70°C, while the temperature within the second section is maintained, by means not shown, in the range 150°C to 200°C. This section 2 is pressurized to keep water liquefied. If desired both of the sections 1 and 2 may be at the same elevated pressure to facilitate the flow of water from the first section 1 to the second section 2.

Liquid water having deuterium concentrated therein, that is liquid water enriched with deuterium, is withdrawn from the system by being extracted from pipe 6 by pipe 10. As will become apparent from the following explanation of the concentration process, it is also possible to withdraw gaseous hydrogen having deuterium concentrated therein from pipe 14 (by a pipe 20 shown dotted), instead of withdrawing the liquid water, containing deuterium concentrated therein, from pipe 6.

Within the first and second sections 1 and 2, although liquid water and hydrogen gas flow over the catalyst assemblies 3, the water repellent coatings of the catalyst assemblies 3 cause only water vapour and hydrogen gas to mainly contact the catalytically active metal and so at each catalyst assembly deuterium is transferred by the catalytically active metal to either the hydrogen gas or water vapour depending on the temperature within the first or second sections 1 and 2 and the relative D/H ratios in the two substances. Thus in the first section 1, which is at a temperature within the range 15°C to 60°C, water vapour has deuterium concentrated therein while in the second section 2 hydrogen gas has deuterium concentrated therein, and the exchange reaction may best be expressed by the equilibrium equation:

HD gas + $H_2O$ vapour $\overset{catalyst}{\rightleftharpoons}$ $H_2$ gas + HDO vapour, hereinafter referred to as "Reaction 1".

However, a further, second deuterium exchange reaction occurs simultaneously and is closely coupled with the above exchange reaction. The second deuterium exchange reaction occurs in the first section 1 between water vapour enriched with deuterium from hydrogen gas, by the first exchange reaction, and liquid water flowing over the catalyst assemblies 3 in the first section 1, and may best be expressed by the equation:

HDO vapour + $H_2O$ liquid $\overset{liquid\ water}{\underset{surface}{\rightleftharpoons}}$ $H_2O$ vapour + HDO liquid.

This second deuterium exchange reaction is a molecular evaporation/condensation exchange, that is HDO vapour passes into and through the liquid water surface and is replaced by $H_2O$ vapour from the liquid water, thus maintaining the dynamic water vapour saturation conditions and this may be diagrammatically shown as follows:

Similarly, in the second section 2, which is at a temperature within the range 150°C to 200°C, the hydrogen gas has deuterium concentrated therein from HDO vapour which is displaced from the liquid water by $H_2O$ vapour entering the deuterium enriched liquid water thus:

Thus the second reaction can best be expressed by the equilibrium equation:

HDO vapour + $H_2O$ liquid $\overset{liquid\ water}{\underset{surface}{\rightleftharpoons}}$ $H_2O$ vapour + HDO liquid and is hereinafter referred to as "Reaction 2." The dynamic evaporation and condensation of molecules occurs naturally in any system consisting of a liquid in contact with its vapour as is well known and understood by chemical engineers.

The "Reaction 1" above occurs within each catalyst assembly, between hydrogen gas molecules and water vapour molecules that have diffused into the catalyst support, at catalytically active metal surface sites, and accomplishes dynamic hydrogen isotope (deuterium) exchange between hydrogen gas and water vapour molecules. This "Reaction 1" leads to the result that the concentration of the hydrogen isotopes in the respective molecular species tends, or changes, toward the natural equilibrium value, which depends on the temperature and relative concentrations of the said species, as already discussed. When water vapour molecules diffuse out of catalyst assemblies 3, they are subject to, and undergo, the "Reaction 2." The equilibrium constant for the "Reaction 2" depends on the temperature, but differs from unity by only a few percent as shown in the following table:

| TEMP. °C | $K = \dfrac{(HDO)\ liquid\ (H_2O)\ vapour}{(H_2O)\ liquid\ (HDO)\ vapour}$ |
|---|---|
| 20 | 1.079 |
| 30 | 1.069 |
| 40 | 1.060 |
| 100 | 1.029 |
| 200 | 1.003 |
| 250 | 0.997 |

However, up to about 200°C, there is a tendency for the deuterium isotope to prefer the liquid to the vapour state, which results in a further slight enrichment of deuterium in the liquid water.

The exchange of hydrogen isotopes between water vapor and liquid water, "Reaction 2," does not require a catalyst, but as stated above it does require liquid water surface area.

By means of the two reactions just discussed, hydrogen isotopes are thus effectively exchanged between hydrogen gas and liquid water. As a result of the natural equilibrium constants for the two said reaction, hydrogen isotopes are transferred from one fluid to the other, that is to say from gaseous hydrogen to liquid water or vice-versa, depending on the isotopic concentrations in these fluids, and the temperature of these fluids, in proximity with one another and with the catalyst. By means of a counter-current cascade and opposite flow of hydrogen gas and liquid water, at least between two sections, as represented by the first and second sections 1 and 2, one hydrogen isotope is effectively transported in an opposite direction to another hydrogen isotope, as taught in U.S. Pat. No. 2,787,526 dated Apr. 2, 1957, (J. S. Spevack). Those skilled in the art will know how to combine a number of such sections at different temperatures, into a cascade or to use one or more sections with a hydrogen gas reflux, how to use water as feed with hydrogen gas recycled, or hydrogen gas as feed with water recycled, in order to accomplish the specific hydrogen isotope separation desired.

Figure 2:
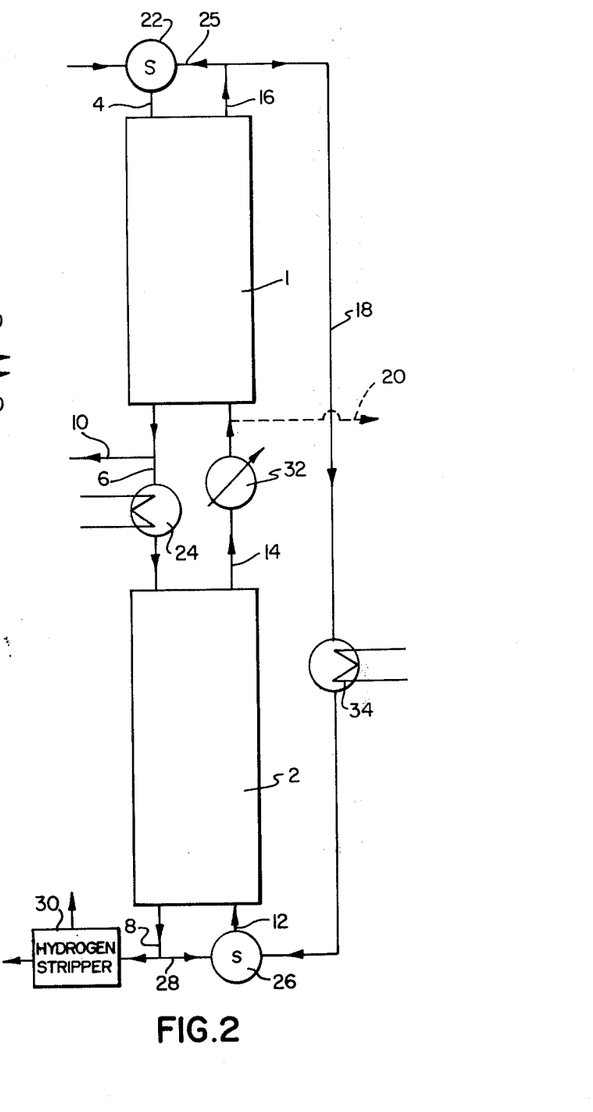
FIG. 2 is a similar diagrammatic side view to FIG. 1, but more detailed, of an apparatus for deuterium exchange and concentration between liquid water and hydrogen gas.

In FIG. 2, where similar parts to those shown in FIG. 1 are designated by the same reference numerals and the previous description is relied upon to describe them, the catalyst assemblies are not shown in detail in the first and second sections 1 and 2.

In FIG. 2 a saturator 22 is included in the liquid feed water inlet pipe 4 and is connected to the hydrogen gas outlet 16 to saturate feed water to the first section 1 with hydrogen gas. The saturator 22 is fed hydrogen gas from pipe 16 by a pipe 25. A water heater 24 is provided to heat liquid water conveyed by outlet pipe 6 to the second section 2. A saturator 26 is provided in hydrogen gas inlet pipe 12 to saturate hydrogen gas passing from pipe 12 into the second section 2 with water vapour. The saturator 26 is fed liquid water from pipe 8 by a pipe 28.

Water depleted in deuterium and passing to waste along pipe 8 passes through a hydrogen gas stripper 30 where hydrogen gas is recovered for further use.

Hydrogen gas passing along pipe 14 from the second section 2 to the first section 1 is cooled in a cooler/condenser 32.

The hydrogen gas depleted of deuterium and passing along pipe 18 is heated by a heater 34 before passing through the saturator 26 to the second section 2.

The apparatus shown in FIG. 2 functions in the same manner as the apparatus shown in FIG. 1 except that the saturators 22 and 26 and hydrogen stripper 30 effect useful economies in the process.

In one series of experiments with a "section," liquid water enriched in deuterium to a D/H ratio of about 1,000 to $10^6$, and tank hydrogen gas having a D/H ratio of about 100 to $10^6$, both determined by precision mass spectrometry, were used. The D/H ratio of the effluent hydrogen (dried) was determined by mass spectrometry.

Exchange of deuterium from enriched water to a hydrogen gas stream was used for experimental convenience only to demonstrate the activity of the catalyst.

Figure 3:
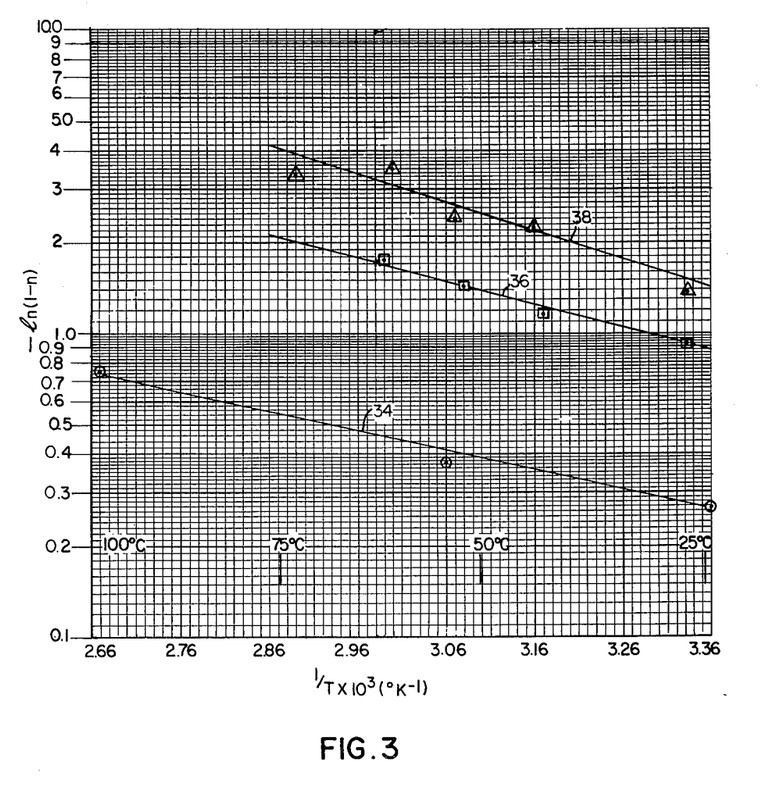
FIG. 3 shows graphs of one section efficiencies versus the reciprocal of the absolute temperature at which deuterium is exchanged between water and hydrogen times $10^{-3}$, for a silicone resin coated catalyst.

Referring to FIG. 3 there are shown graphs 34, 36 and 38 of some representative single section efficiencies for a catalyst for the exchange of deuterium. The graphs 34, 36 and 38 are semilogarithm plots of a function of $\eta$ (eta), namely "$-ln(1-\eta)$", versus the reciprocal of the absolute temperature at which deuterium is exchanged between water and hydrogen gas times $10^3$.

$\eta$ is defined by relation: 
$$\eta = \frac{A - B}{\frac{C}{K_T} - B}$$

where, A is the D/H ratio of the effluent hydrogen,
B is the D/H ratio of the influent hydrogen,
C is the D/H ratio of the water being contacted, and
$K_T$ is the equilibrium constant for hydrogen/liquid water exchange at the temperature at which the overall isotope exchange
$H_2O$ liquid + HD $\rightleftharpoons$ HDO liquid + $H_2$ is carried out.
$\eta$ is thus a measure of the approach to equilibrium, or the efficiency of a given depth of catalyst. The function plotted, $-ln(1-\eta)$ is an indication of reaction rate, and is commonly used in investigating such reactions.

For all of the graphs 34, 36 and 38 the catalyst bodies comprised 3mm × 3mm right cylinder catalyst supports of $Al_2O_3$ with 0.5 percent by weight Pt thereon. The coating was the silicone resin previously referred to as Dow Corning 773 Water Repellent. Also, for all of the graphs 34 to 38 flowing, distilled $H_2O$ in liquid form containing 1143 ppm $D_2O$, and flowing hydrogen gas containing 104.4 ppm $D_2$ were used. The molar ratio of water to gas flow was in the range of 5 to 10.

For the graph 34 a bed of the catalyst 2.4 cm diameter × 2.5 cm deep was used and the hydrogen gas was passed through the bed at 7.8 atmospheres pressure and, at a superficial velocity of 7.66 cm/second measured at standard temperature and pressure.

For the graph 36 a bed of the catalyst 2.1 cm diameter × 5.0 cm deep was used, and the hydrogen gas was passed through the bed at the velocity of 1.44 cm/second at one atmosphere.

For the graph 38 a bed of the catalyst 2.1 cm diameter × 5.0 cm deep was used, and the hydrogen gas was passed through the bed at the velocity of 0.44 cm/second, at one atmosphere.

The data shown in the graphs 34, 36 and 38 was obtained to determine behaviour of exchange rate versus temperature.

The effects of:
1. different depths for the bed of catalyst assemblies
2. different apparent gas volocities for the hydrogen gas, and
3. different mass flow rates for the hydrogen gas, when contacting one another and the catalyst assemblies, have been investigated in a similar system and with a similar catalyst.

Figure 4:
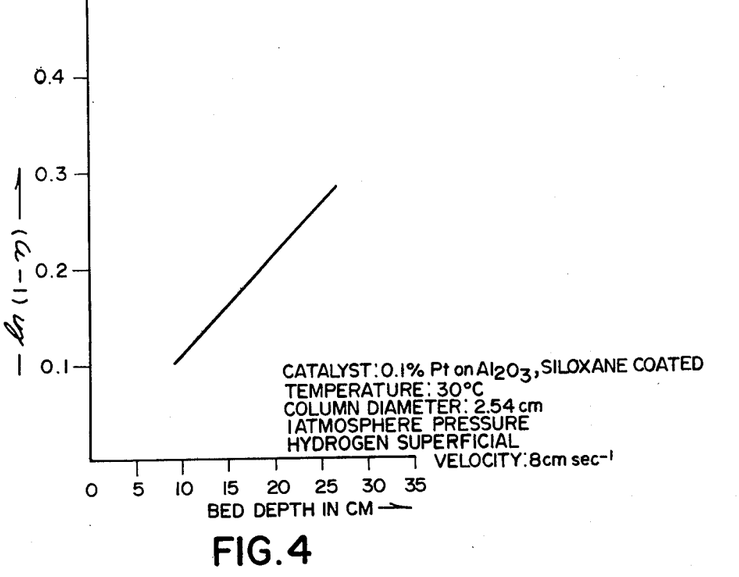
FIG. 4 shows a graph of one section efficiencies versus catalyst bed depth.

FIG. 4 shows the effect of bed depth on the exchange efficiency for a siloxane coated 0.1 percent by weight Pt catalyst on an $Al_2O_3$ catalyst support. The column was at a temperature of 30°C. Column diameter was 2.54 cm and the catalyst bed depth was 10.0 cm. The hydrogen gas was at one atmosphere pressure and the hydrogen gas superficial velocity was 8 cm $sec^{-1}$.

Figure 5:
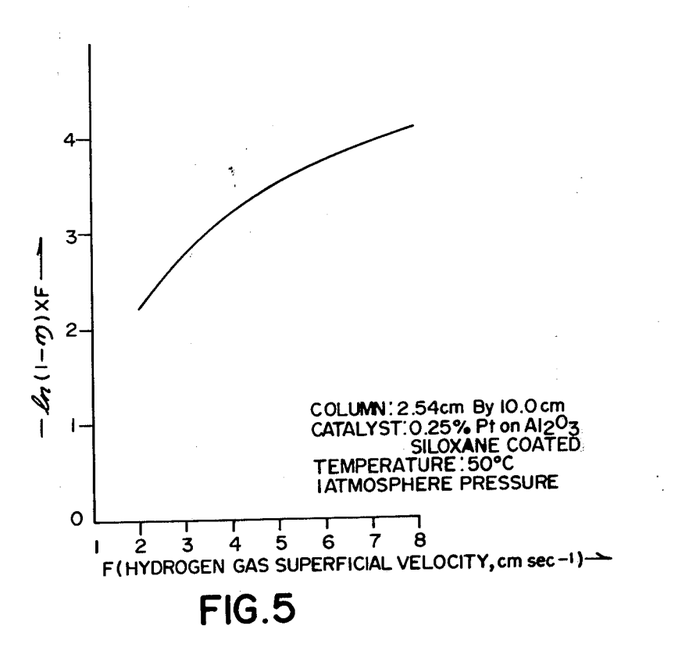
FIG. 5 shows a graph of one section efficiencies versus hydrogen gas velocity through the catalyst bed.

FIG. 5 shows the effect of different hydrogen gas superficial velocities in cm $sec^{-1}$ on the exchange efficiency using a siloxane coated, 0.25 percent by weight Pt catalyst on a $Al_2O_3$ catalyst support. The column was at a temperature of 50°C, column diameter was 2.54 cm and catalyst bed depth was 10.0 cm. The hydrogen gas was at one atmosphere pressure.

Figure 6:
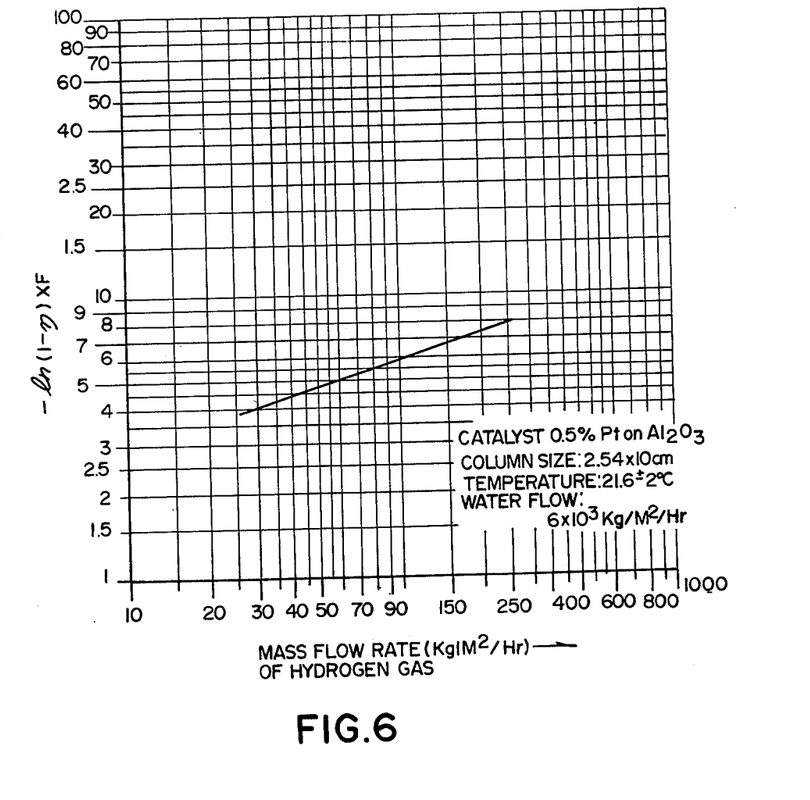
FIG. 6 shows a graph of one section efficiencies versus mass flow rate of feed water.

In FIG. 6 the effect on the exchange efficiency for different mass flow rates in $Kg/M^2/Hr$ for the hydrogen gas are shown in a log-plot. A polytetrafluoroethylene coated 0.5% by weight Pt catalyst on a $Al_2O_3$ catalyst support was used. The column was at a temperature of $21.6 \pm 2°C$. Column diameter was 2.54 cm and catalyst bed depth was 10 cm. The liquid water flow rate was $6 \times 10^3$ $Kg/M^2/Hr$. Hydrogen pressure ranged from one to seven bars and hydrogen flow rates ranged up to 30 cm/sec.

The above hydrogen/liquid water, dual temperature exchange process catalyst bodies according to the present invention may also be used in conjunction with

1. Re-enrichment of hydrogen with deuterium, from liquid water for what are known as the hydrogen/ammonia process and the hydrogen/amine exchange process for deuterium enrichment;
2. Extraction and transfer of deuterium from hydrogen, at the rich end of a hydrogen/ammonia or hydrogen/amine process, to liquid water;
3. Processes for upgrading of heavy water involving, for example, electrolysis of water and recombination of hydrogen and oxygen by combustion or other means as phase conversion methods at either end of an exchange stage;
4. Any process wherein efficient exchange and equilibration of hydrogen isotopes between liquid water and hydrogen gas is required, as for example decreasing the tritium content in reactor heavy water, and
5. The water vapour/hydrogen gas hydrogen isotope exchange process.

In this specification permeable to water vapour and hydrogen gas means the catalyst metal surface is accessible to gases including water vapour and hydrogen gas through the coating and the mechanism of access may include passage of molecules through openings in the coating, and diffusion through the coating itself. It is not intended that the present invention be bound by any particular theory of exact function of the coating.

While the process according to the present invention has been described for deuterium exchange and concentration between liquid water and hydrogen, it will be appreciated that exchange will occur simultaneously of protium or tritium if present in the liquid water and hydrogen gas, and that the conditions may alternatively be optimized for tritium separation and recovery in liquid water or hydrogen gas.

In this specification "water repellent" means liquid-water-repellent. I claim:

1. A bithermal, catalytic, isotope exchange process for hydrogen isotope concentration between liquid water and hydrogen gas, comprising:
   a. contacting at a temperature in the range 15°C to 70°C, in a first section liquid feed water and, the hydrogen gas from a second section with one another and with a catalyst consisting of at least one catalytically active metal selected from Group VIII of the Periodic Table so that the deuterium isotope of hydrogen is transferred to and concentrated in the liquid water passing through and leaving the first section from the hydrogen gas passing through and leaving the first section, in either counter-current or cocurrent flow,
   b. contacting at a temperature in the range 150°C to 200°C, in a second section pressurized to keep water liquefied, the liquid water from the first section and the hydrogen gas, passing to the first section, with one another and with a catalyst consisting of at least one catalytically active metal selected from Group VIII of the Periodic Table so that the hydrogen isotope deuterium is transferred to and concentrated in the hydrogen leaving the second section from the liquid water passing through the second section, and
   c. withdrawing from between the first and second sections a portion of the liquid water having the hydrogen isotope deuterium concentrated therein or the hydrogen gas having the hydrogen isotope deuterium concentrated therein, and wherein the improvement comprises:
   d. the catalyst is provided in the first and second sections as at least one catalyst assembly, and comprises the catalyst and a substantially liquid-water-repellent organic resin or polymer coating thereon, which is permeable to water vapour and hydrogen gas, whereby:
   e. each catalyst assembly causes hydrogen isotope exchange and concentration to occur as follows:

and so that direct contact between the catalyst metal and liquid water and wetting of the catalyst is retarded by the organic polymer or resin coating, thereby retarding poisoning of the catalyst by the liquid water.

2. A process according to claim 1, wherein the hydrogen from the first section is recirculated through the second section to the first section.

3. A process according to claim 1, wherein each catalyst assembly comprises a catalyst support, the catalyst and the substantially liquid-water-repellent organic polymer or resin coating thereon, the catalyst support consists of at least one material selected from the group carbon, graphite, charcoal, alumina, magnesia, silica, silica gel, chromia, molybdenum oxide, tungstic oxide, nickel oxide, kieselguhr, and metal substrate, and the catalyst is at least one metal selected of the group consisting of Pt, Rh, Ir, Pd and Ni.

4. A process according to claim 3, wherein for each catalyst assembly the total amount of catalyst is not greater than 5 percent by weight of the total weight of that catalyst assembly, and the total amount of the substantially liquid-water-repellent organic polymer or resin coating is not greater than 10 percent by weight of the total weight of that catalyst assembly.

5. A process according to claim 4, wherein for each catalyst assembly the total amount of catalyst is in the range 0.5 to 1.0 percent by weight of the total weight of that catalyst assembly, and the catalyst is located in an outer surface layer of the support.

6. A process according to claim 1, wherein the coating is a polyfluorocarbon.

7. A process according to claim 1, wherein the coating is a polytetrafluoroethylene having a fibrous network or mesh structure.

8. A process according to claim 7, wherein said polytetrafluoroethylene is applied to said catalyst as a colloidal suspension, dispersing liquid is evaporated to leave particles of the polytetrafluoroethylene on the catalyst, and the particles are sintered to form the fibrous network, or mesh structure.

9. A process according to claim 1, wherein the coating is a silicone.

10. A process according to claim 9, wherein said silicone comprises a polysiloxane.

11. A process according to claim 10, wherein said polysiloxane is a polyalkylsiloxane, having a minor amount of substituent groups selected from hydroxyl, methoxyl and ethoxyl.

12. A process according to claim 10, wherein the coating comprises a polyalkylsiloxane, having a minor amount of substituent groups selected from hydroxyl, methoxyl, and ethoxyl and including substituents selected from ethyl, propyl, isopropyl and t-butyl groups.

13. A process according to claim 9, wherein the coating is from about 1 to 10 percent by weight of said catalyst support.

14. A process according to claim 9, wherein the coating is from about 2 to 5 percent by weight of the catalyst support.

15. A process according to claim 9, wherein the coating is from about $10^{-3}$ to $10^{-1}$ microns average thickness.

* * * * *

UNITED STATES PATENT OFFICE
CERTIFICATE OF CORRECTION

Patent No. 3,888,974      Dated June 10, 1975

Inventor(s) William H. Stevens

It is certified that error appears in the above-identified patent and that said Letters Patent are hereby corrected as shown below:

Column 6, lines 44 to 52, the formula should appear as shown below:

Signed and Sealed this

*twenty-third* Day of *September 1975*

[SEAL]

Attest:

RUTH C. MASON
*Attesting Officer*

C. MARSHALL DANN
*Commissioner of Patents and Trademarks*